(12) United States Patent
Dini

(10) Patent No.: US 11,014,620 B2
(45) Date of Patent: May 25, 2021

(54) BALLAST FOR OPERATING MACHINE

(71) Applicant: Sandro Dini, Anghiari (IT)

(72) Inventor: Sandro Dini, Anghiari (IT)

( * ) Notice: Subject to any disclaimer, the term of this patent is extended or adjusted under 35 U.S.C. 154(b) by 255 days.

(21) Appl. No.: 15/776,247

(22) PCT Filed: Nov. 15, 2016

(86) PCT No.: PCT/IB2016/056865
§ 371 (c)(1),
(2) Date: May 15, 2018

(87) PCT Pub. No.: WO2017/085620
PCT Pub. Date: May 26, 2017

(65) Prior Publication Data
US 2020/0247487 A1      Aug. 6, 2020

(30) Foreign Application Priority Data
Nov. 16, 2015   (IT) .......................... UB2015A005602

(51) Int. Cl.
| | |
|---|---|
| *B62D 49/08* | (2006.01) |
| *B62D 49/06* | (2006.01) |
| *B66C 23/72* | (2006.01) |
| *E02F 9/18* | (2006.01) |

(52) U.S. Cl.
CPC ....... *B62D 49/085* (2013.01); *B62D 49/0628* (2013.01); *B66C 23/72* (2013.01); *E02F 9/18* (2013.01)

(58) Field of Classification Search
CPC .. B62D 49/0628; B62D 49/085; B66C 23/72; B66C 23/74; B66C 23/76; E02F 9/18
See application file for complete search history.

(56) References Cited

U.S. PATENT DOCUMENTS

| | | | | | |
|---|---|---|---|---|---|
| 2,759,563 | A | * | 8/1956 | Marnon | B66F 9/07554 |
| | | | | | 280/755 |
| 2,891,681 | A | * | 6/1959 | Greivell | B62D 49/085 |
| | | | | | 212/196 |
| 4,659,102 | A | * | 4/1987 | Stuhrmann | A01B 59/048 |
| | | | | | 280/481 |

(Continued)

FOREIGN PATENT DOCUMENTS

| | | | |
|---|---|---|---|
| DE | 3223990 A1 | * 12/1983 | ........... B62D 49/085 |
| DE | 102005040954 A1 | 12/2006 | |

(Continued)

OTHER PUBLICATIONS

International Search Report and Written Opinion for International Application No. PCT/IB2016/056865 (12 Pages) ( dated Mar. 14, 2017).

(Continued)

*Primary Examiner* — Laura Freedman
(74) *Attorney, Agent, or Firm* — Lucas & Mercanti, LLP

(57) ABSTRACT

Ballast for operating machines, having a portion removably couplable to a hooking seat of the operating machine, characterized by having a fixed part is provided. The couplable portion, a movable part and means for constraining the movable part to the fixed part at a plurality of distinct distances (D, D', D") from the fixed part are provided, so as to change the center of gravity position of the operating machine.

10 Claims, 5 Drawing Sheets

(56) References Cited

U.S. PATENT DOCUMENTS

| | | | |
|---|---|---|---|
| 5,598,935 A | 2/1997 | Harrison et al. | |
| 7,618,062 B2* | 11/2009 | Hamm | B62D 49/085 |
| | | | 280/759 |
| 8,354,649 B2* | 1/2013 | Cao | F16M 11/048 |
| | | | 250/393 |
| 8,602,153 B2* | 12/2013 | Osswald | B62D 21/14 |
| | | | 180/209 |
| 8,925,964 B1* | 1/2015 | Duppong | B62D 49/085 |
| | | | 280/759 |
| 10,066,782 B2* | 9/2018 | Bax | F16M 11/048 |
| 2016/0169413 A1* | 6/2016 | Camacho | F16L 1/036 |
| | | | 701/50 |

FOREIGN PATENT DOCUMENTS

| | | | | |
|---|---|---|---|---|
| EP | 0315595 A2 * | 5/1989 | | B62D 49/085 |
| EP | 2042410 A2 | 4/2009 | | |
| EP | 2868554 A1 | 5/2015 | | |
| JP | 2012057299 A * | 3/2012 | | E02F 9/18 |

OTHER PUBLICATIONS

Italian Search Report for orresponding Italian Application No. IT UB20155602 (2 Pages) ( dated Aug. 1, 2016).

* cited by examiner

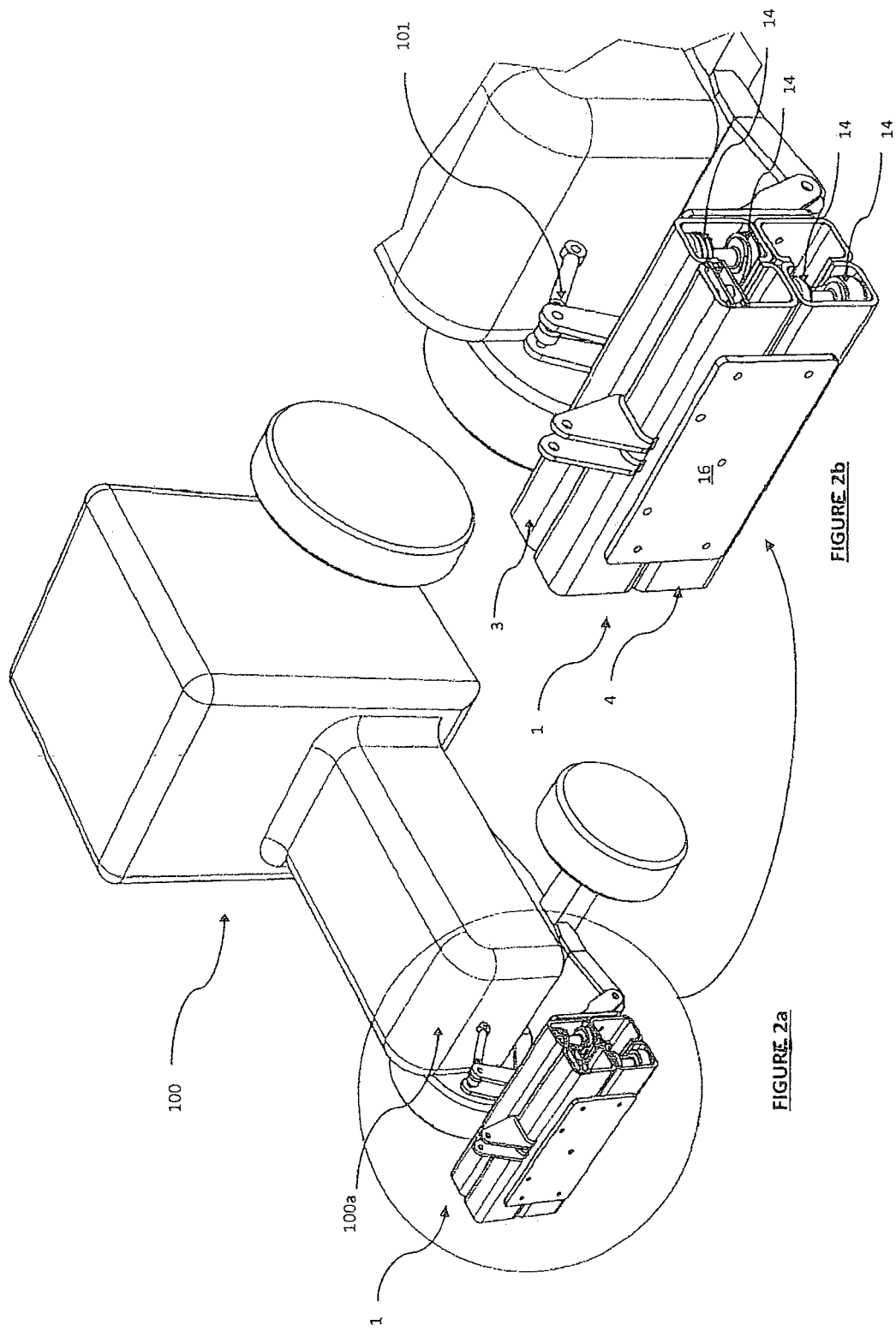

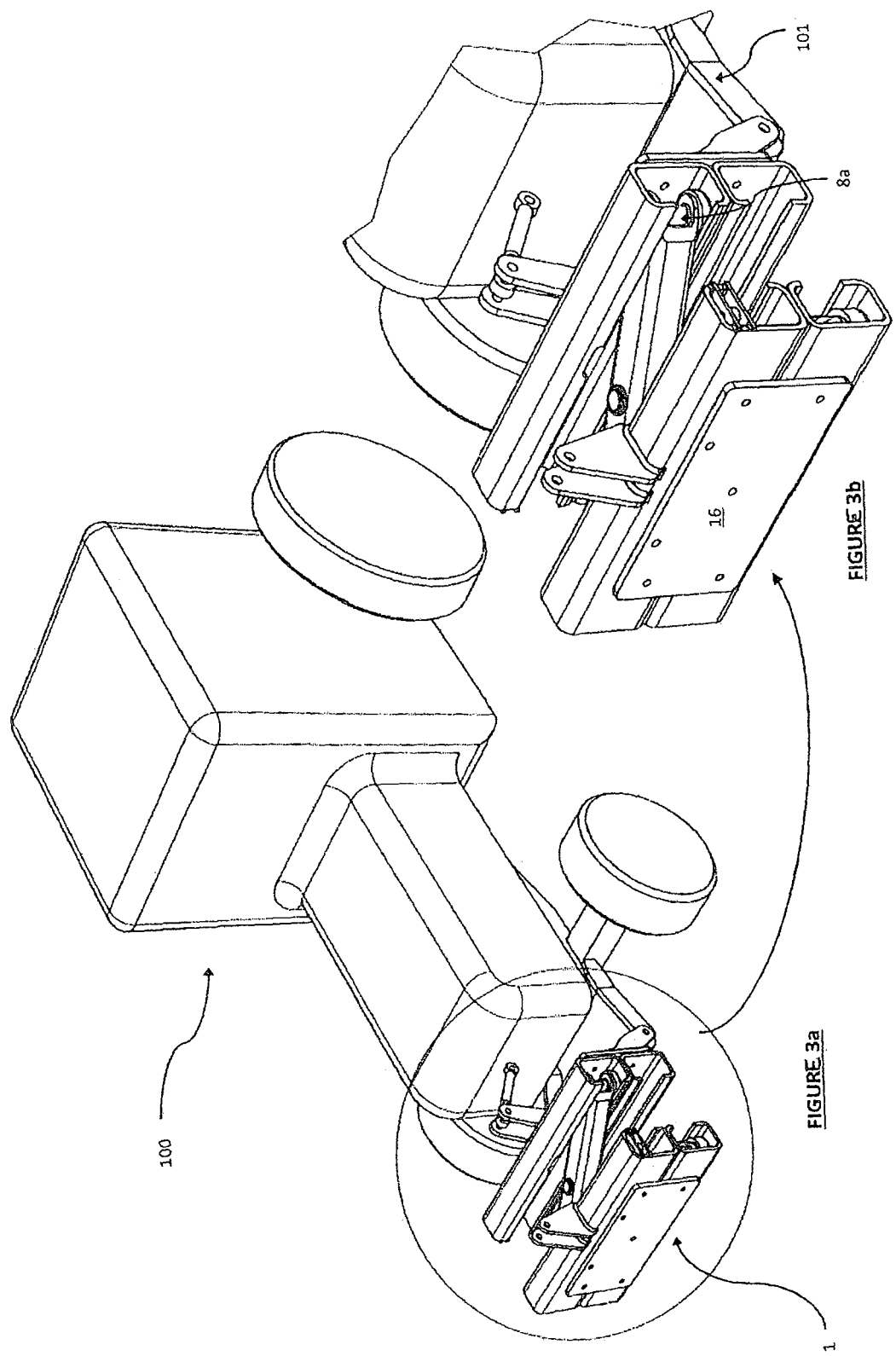

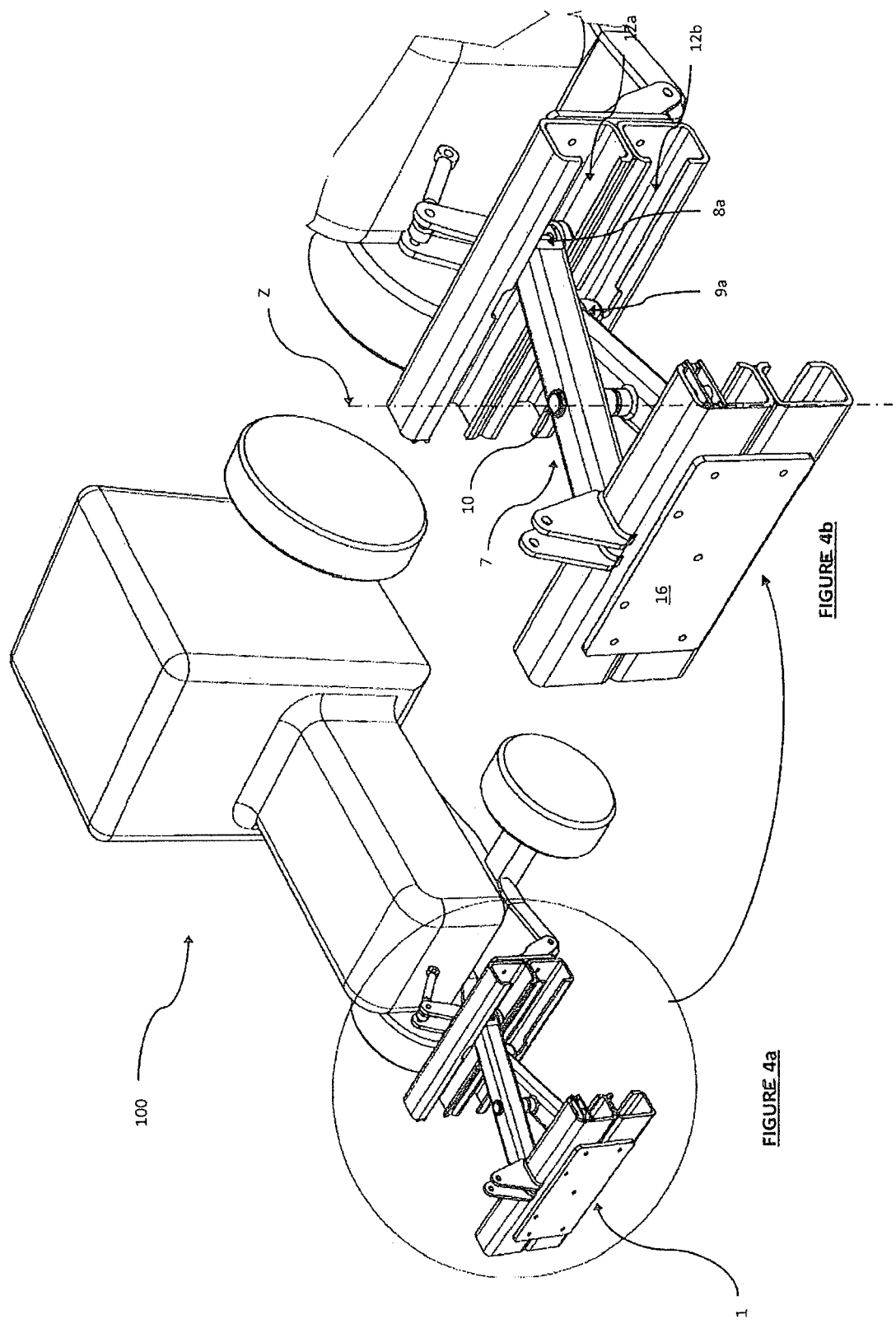

BALLAST FOR OPERATING MACHINE

CROSS-REFERENCE TO RELATED APPLICATIONS

This application is a 371 of PCT/IB2016/056865, filed Nov. 15, 2016, which claims the benefit of Italian Patent Application No. UB2015A005602, filed Nov. 16, 2015.

FIELD OF THE INVENTION

The present invention relates to ballast for operating machine. It has to be noted that by operating machine any vehicle and/or machine able to automatically and/or manually perform mechanical operations will be meant. In particular, under the term operating machine machines are meant such as, for example, excavators, road working machinery, building machines, agricultural machinery such as, for example, tractors, lifting machinery of the lift truck type and the like, and others.

KNOWN PREVIOUS ART

According to known art such operating machines, sometimes, have to be weighed down in order to have higher tire grip at the starting and breaking steps, in conjunction with better balancing of masses. Such weighing down and/or redistribution of the machine or vehicle weights, with subsequent displacement of the center of gravity thereof, aims to prevent the drive wheels from slipping and, simultaneously, to allow exploiting the driving torque the vehicle is provided with. Furthermore, the weighing down and/or redistribution of weights also has the non-secondary task of preventing the operating machine from tilting or even rolling over during the working steps.

The means allowing the weighs of an operating machine to be weighed down and/or balanced is termed ballast.

The aforementioned ballast becomes essential also in case of operating machines used to lift platforms or provided with mechanical arms for lifting heavy objects. In such cases, the torque the machine is subjected to, especially when the mechanical arm or the platform is in a cantilevered configuration with respect to the machine frame, is highly dangerous and has to be well balanced just by the use of one or more ballast properly arranged on the machine.

Ballast is usually metal blocks, made of steel or cast iron, that are linked to at least one of the sides of the operating machine, depending on the type of working such machine is subjected to.

In general, this ballast can be combined with the operating machine by means of convenient hooking seats prearranged on the operating machine ad adapted to be combined with a coupling portion of the ballast itself.

However such ballast is not free from drawbacks. In fact, although the possibility is provided of replacing the ballast of the operating machine depending on required working, however such operation is very slow and complex. Furthermore, the user is not offered with any possibility of precisely selecting the balancing to which the vehicle has to be subjected. In practice, the user can only decide among two or three different typologies of ballast, differing in shape and/or weight, without however having the real possibility of achieving the perfect balancing of the machine, but only an approximate one. Due to the approximation level, the selection of the ballast itself is carried out after several and repeated attempts, i.e. by assembling and disassembling several times the available ballast, with the subsequent waste of energy and resources. Furthermore, also during the same working the change the type of ballast can be required and, thus, to provide to the afore described operations, with remarkable waste of energies and time.

It is object of the present invention to implement ballast that remarkably reduces the times required to determine the correct distribution of weights of an operating machine.

It is further object of the present invention to implement ballast that is however structurally simple and user-friendly.

SUMMARY OF THE INVENTION

These and other objects are achieved by ballast for operating machine, comprising at least one portion removably couplable to at least one hooking seat of said operating machine, characterized by comprising at least one fixed part provided with said at least one couplable portion, at least one movable part and means for constraining said movable part to said fixed part at a plurality of distinct distances from said fixed part, so that to change the center of gravity position of said operating machine.

Such a solution thus allows changing the distribution of weights and, thus, the center of gravity position of the machine on which it is installed without the need to be removed from the vehicle, but simply by varying the distance of the movable part with respect to the fixed part.

Furthermore, still according to the invention, said constraining means comprise a removal/approach device for moving said movable part away/closer from/to said fixed part along at least one movement direction for said movable part with respect to said fixed part.

In particular, said removal/approach device comprises at least one pantograph member comprising a first arm and a second arm both hinged in a point; said at least one first arm and said at least one second arm are each provided with at least one first end sliding along said fixed part and with at least one second end sliding along said movable part. According to such a solution, said at least one direction of movement of the movable part with respect to the fixed part is substantially orthogonal to the sliding direction of said at least one first sliding end of said at least one first arm and one second arm and of said at least one second sliding end of said at least one first arm and one second arm.

Always according to the invention, each end of said first arm and said second arm comprises at least one roller sliding with respect to appropriate guides being on said movable part and said fixed part; in particular, said movable part and said fixed part are each provided with at least two guides so that each roller can slide. Such at least two guides are made by substantially C-bent sheets, or longitudinally cut tubular elements or solid tubular elements which have been hollowed out before.

Furthermore, such removal/approach device further comprises actuating means to actuate the displacement of said at least one first arm and/or said at least one second arm. Such actuating means comprise at least one actuator selected from hydraulic, pneumatic and electric one.

In addition, according to the invention, such ballast comprises a load member that can be removably combined with said movable part of said ballast. In particular, said movable part comprises a bracket to removably hook said at least one load member to said movable part.

Finally, said movable part and/or said fixed part are made of a metal material selected from steel, cast iron, or cement and more.

BRIEF DESCRIPTION OF THE FIGURES

These and other aspects of the present invention will be made clearer by the following specification of a preferred embodiment, herein provided for purposes of illustration and not limitative, with reference to the accompanying figures, in which:

FIGS. 2a and 2b, 3a and 3b, 4a and 4b show axonometric overall and detail views, respectively, of a tractor which ballast is combined with, according to the invention, at three distinct distances from the movable part with respect to the fixed part.

DETAILED DESCRIPTION OF A PREFERRED EMBODIMENT OF THE PRESENT INVENTION

Referring to the above figures, the ballast 1 according to the invention and an operating machine 100 on which such ballast 1 is installed are depicted.

Figure 1A:
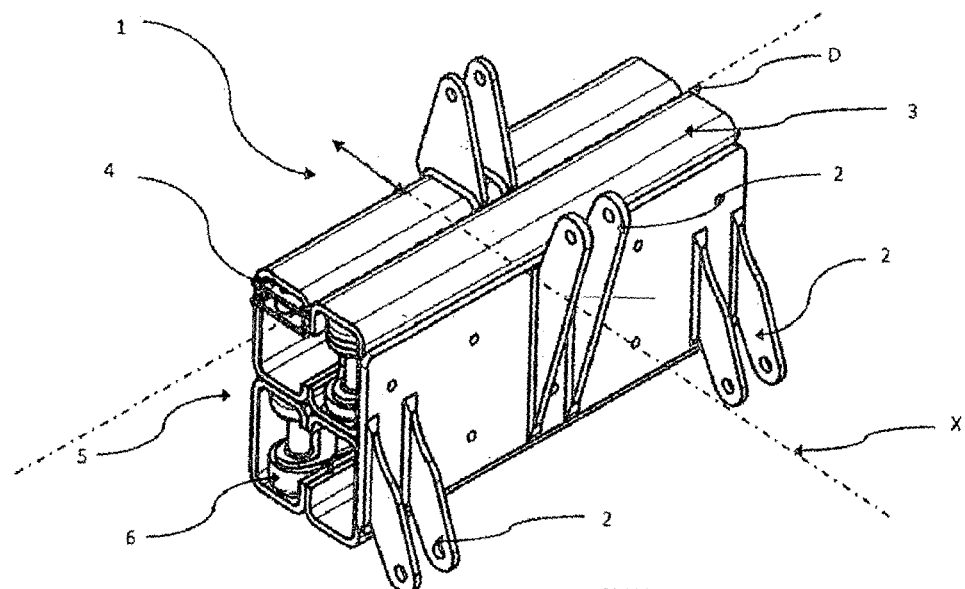
FIGS. 1a, 1b and 1c show axonometric views of ballast according to the invention, wherein the movable part is at three distinct distances from the fixed part.
Figure 1B:
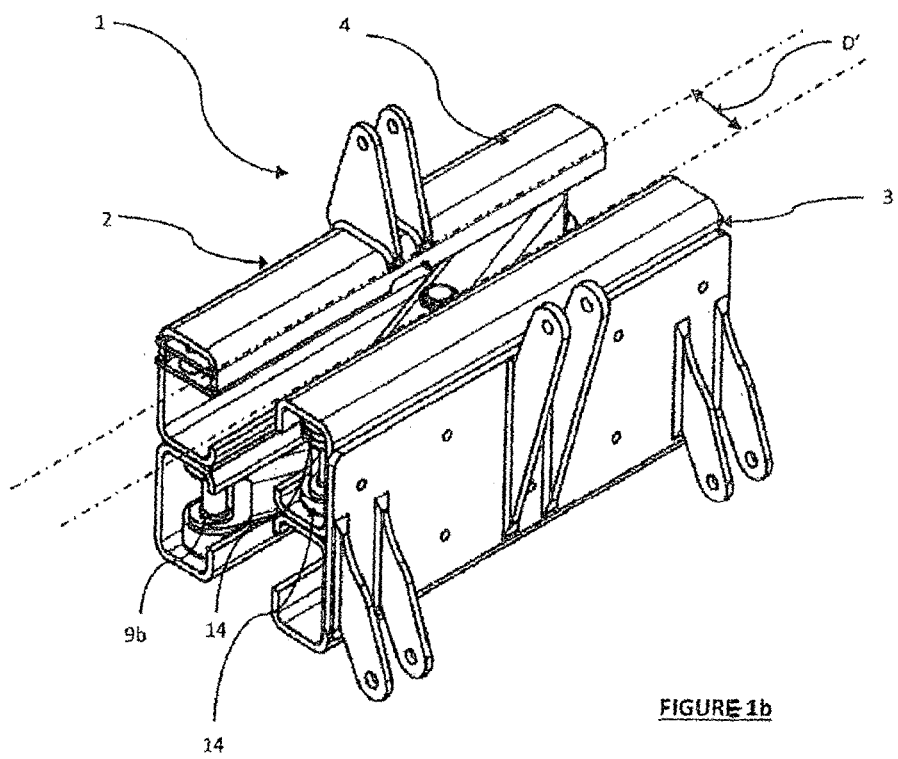
Figure 1C:
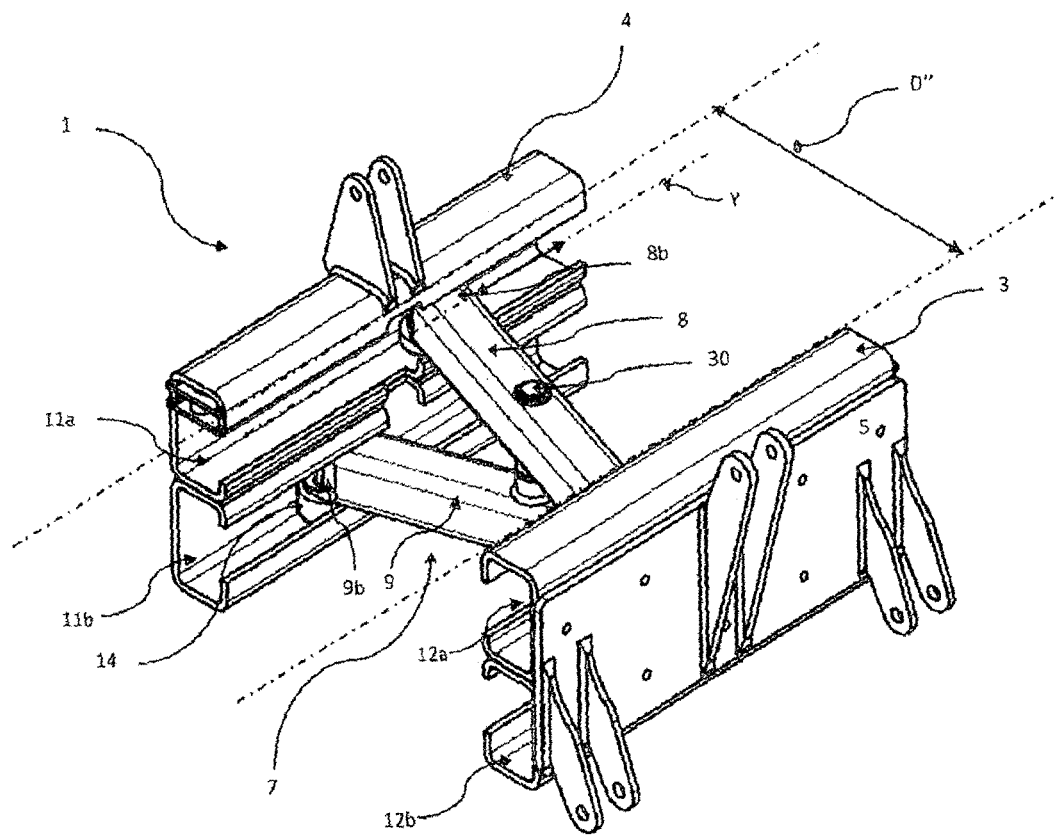

As visible in the accompanying figures, the ballast 1 comprises three portions 2 removably couplable to as many three hooking seats 101 of an operating machine 100. Advantageously, the ballast 1 comprises a fixed part 3 provided with the afore mentioned couplable portions 2, a movable part 4 and means 5 for constraining the movable part 4 to the fixed part 3 at a plurality of distances D, D' and D" distinct from the fixed part 3, such as to change the center of gravity position of the operating machine 100 with which the ballast 1 is combined. In FIG. 1a the movable part 4 is in practice contacting with the fixed part 3, i.e. the distance D between the fixed part 3 and the movable one 4 is null. In FIGS. 1b and 1c the movable part 4 is, respectively, at a gradually increasing distance with respect to the fixed part 3, i.e. D' and D". From the afore mentioned figures it should be understood that as the distance of the movable part 4 changes with respect to the fixed one 3, also the weight distribution of the operating machine 100 with which the ballast 1 is combined, changes. In this way, according to the needs, the weight distribution and, thus, the center of gravity position of the operating machine 100 can be changed without the need of removing the ballast 1 from the machine 100 itself, but simply by changing the distance of the movable part 4 with respect to the fixed part 3. Furthermore, it is clear that the number of distances between the movable part 4 and the fixed one 3 is higher than three and comprises the whole interval between the minimum distance D and the maximum one D" of the movable part 4 with respect to the fixed part 3.

According to the embodiment described herein, the constraining means 5 comprise a removal/approach device 6 for moving the movable part 4 away/closer from/to the fixed one 3 along a direction of movement X for the movable part 4 with respect to the fixed part 3.

It has to be noted however that, despite herein not described in detail nor shown in a particular embodiment, the ballast 1 in which the movable part 4 moves with respect to the fixed part 3 along two or three distinct movement directions still falls in the protection scope of the present invention.

As still visible in the accompanying figures, the removal/approach device 6 comprises a pantograph member 7 comprising in turn a first arm 8 and a second arm 9 hinged in a point 10 by means of a pin 30 whereby the rotation between the first arm 8 and the second arm 9 occurs. The rotation of the first arm 8 with respect to the second arm 9 occurs around the vertical axis Z passing through the point 10, on the center of the pin 30.

The first arm 8 and the second arm 9 are each provided with a first end 8a, 9a sliding along the fixed part 3 and with a second end 8b, 9b sliding along the movable part 4. The two first ends 8a and 9a, as well as the second ends 8b, 9b, slide along the same direction, but in opposite ways one to another. In particular, in the herein described embodiment, the direction of movement X of the movable part 4 with respect to the fixed part 3 is substantially orthogonal to the sliding direction Y of the first sliding end 8a, 9a and the second sliding end 8b, 9b of the first arm 8 and the second arm 9. Such a solution allows the continuous displacement of the movable part 4 with respect to the fixed one 3, from the minimum distance D between the movable part 4 and the fixed one 3, i.e. when the movable part 4 is contacting with the fixed one 3 (see FIGS. 1a and 2b), to the maximum one, i.e. when the movable part 4 is at a distance D" from the fixed one 3 not higher than half the length of the fixed part 3 (see FIG. 1c or 4b), wherein such a length is measured along the sliding direction Y of the first sliding end 8a, 9a of the first arm 8 and the second arm 9.

Furthermore, the pantograph shape of the removal/approach device 6 also ensures perfect weight symmetry along the longitudinal axis of the machine 100 on which the ballast 1 is mounted, as well as optimum stability and mechanical resistance of the ballast 1 itself.

In detail, each end 8a, 8b, 9a, 9b of said first arm 8 and said second arm 9 comprises a pair of rollers 14. Furthermore, the movable part 4 and the fixed part 3 are each provided with two guides 11a, 11b and 12a, 12b for the sliding of each pair of rollers 14 combined with each end 8a, 8b, 9a, 9b of said first arm 8 and said second arm 9. In particular, it has to be noted that the pairs of rollers 14 of the two ends 8a, 9a of the arms 8 and 9 slide, respectively, along the guides 12a and 12b, whereas the pairs of rollers 14 of the two ends 8b, 9b of the arms 8 and 9 slide, respectively, along the guides 11a and 11b.

However it has to be finally noted that in an embodiment of the ballast 1, despite herein not described, in which each end 8a, 8b, 9a, 9b of said first arm 8 and said second arm 9 comprises only one roller still falls in the protection scope of the present invention.

Furthermore, such removal/approach device 6 further comprises actuating means to actuate the displacement of said first arm 8 and said second arm 9. Such actuating means (herein not shown) comprise two linear hydraulic actuators, i.e. with cylinder and piston, arranged on the ballast 1. In particular, one of the two actuators is on the fixed part 3 and acts on the first arm 8, whereas the other actuator is on the movable part 4 and acts on the second arm 9. In practice, the cylinders of the two actuators are integral, respectively, with the movable part 4 and the fixed one 3 and are installed so that the respective pistons during their own stroke urge the ends 8a and 9b, respectively, of the first arm 8 and the second arm 9 along the afore mentioned sliding direction Y and, therefore, produce a mutual rotation of the first arm 8 with respect to the second arm 9 around the pin 30.

It has to be noted that an embodiment in which only one actuator or a higher number of actuator is provided, up to four, still falls in the protection scope of the present invention.

Always according to the herein described embodiment, the two guides 11a, 11b and 12a, 12b are obtained by substantially C-bent sheets welded parallel to one another along the short side of the C, i.e. along the sliding direction Y.

According to an alternative embodiment, the guides 11a, 11b and 12a, 12b can be made from longitudinally cut tubular elements, or solid tubular elements which have been hollowed out before.

In accordance with an embodiment herein not shown, the ballast 1 further comprises a load member (herein not shown) that can be removably combined with the movable part 4 of the ballast 1 itself. In practice, such a load member could consist of further ballast to be linked to the movable part 4. In such an embodiment, the movable part 4 comprises a bracket 16 to removably combine the afore mentioned load member.

It has to be also noted herein that such a load member can consists of ballast of known art, i.e. represented by a simple block, or further ballast 1 as described afore.

According to the invention, the movable part 4 and the fixed part 3 are made of steel. However it has to be noted that both the movable part 4 and the fixed part 3 can be made of a material different from steel such as, for example, cast iron or cement or something else, without for this reason departing from the protection scope of the present invention.

In FIGS. 2a, 2b, 3a, 3b, 4a and 4b an operating machine 100 is shown, such as for example a tractor, comprising the ballast 1 of the afore described type and combined with the front side 100a of the operating machine 100 itself. Such an operating machine 100 further comprises a controlling unit (herein not shown) to control the displacement of said movable part 4 with respect to said fixed part 3 depending on the working load measured by at least one torque meter and/or applied by the machine 100 during the operation thereof. In this way, it is possible to change dynamically and in real time the distance D of the movable part 4 of the ballast 1 with respect to the fixed part 3 and thus to redistribute the weights and, therefore, to change the center of gravity of the operating machine 100 also during the same operation carried out by the operating machine 100.

According to an alternative embodiment of the invention herein not shown, such a machine 100 can comprise the ballast 1 of the type described above and combined with the upper side of the operating machine 100 itself, rather than on one of the four sides of the machine, without for this reason departing from the protection scope of the present invention. In fact, also in this case the ballast 1 is able to change, also dynamically, the center of gravity position of the machine 100 vertically rather than horizontally.

The invention claimed is:

1. A ballast for an operating machine, comprising a portion removably couplable to a hooking seat of said operating machine, said ballast having a fixed part provided with said couplable portion, a movable part and means for constraining said movable part to said fixed part at a plurality of distinct distances (D,D',D") from said fixed part, so as to change the center of gravity position of said operating machine, wherein said constraining means comprise a removal/approach device for moving said movable part away/closer from/to said fixed part along a movement direction (X) of said movable part with respect to said fixed part, wherein said removal/approach device comprises a pantograph member comprising a first arm and a second arm both hinged in a point, said first arm and said second arm being each provided with a first end sliding along said fixed part and with a second end sliding along said movable part, said movement direction (X) being substantially orthogonal to the sliding direction (Y) of said first sliding end of said first arm and said second arm and of said second sliding end of said first arm and said second arm.

2. The ballast according to claim 1, wherein each end of said first arm and said second arm comprises a roller, said movable part and said fixed part being provided with at least two guides so that each roller can slide.

3. The ballast according to claim 2, wherein said two guides are made by substantially C-bent sheets, or from cut tubular elements or solid tubular elements.

4. The ballast according to claim 1, wherein said removal/approach device further comprises actuating means for the displacement of said first arm and/or said second arm.

5. The ballast according to claim 4, wherein actuating means comprise an actuator selected from the group consisting of hydraulic, pneumatic and electric actuators.

6. The ballast according to claim 1, further comprising a load member that can be removably combined with said movable part of said ballast.

7. The ballast according to claim 6, wherein said movable part comprises a bracket to removably combine said load member with said movable part.

8. The ballast according to claim 1, wherein said movable part and/or said fixed part are made of a material selected from the group consisting of steel, cast iron, and cement.

9. An operating machine comprising said ballast according to claim 1, said ballast being combined with one side of said operating machine.

10. The operating machine according to claim 9, further comprising a controlling unit to control displacement of said movable part with respect to said fixed part depending on a load measured by a torque and/or force meter, the torque and/or force being applied by said machine at least during operation thereof.

* * * * *